Dec. 24, 1963     C. E. BRANICK     3,114,937
COLLAPSIBLE CURING RIM
Filed Sept. 25, 1962     2 Sheets-Sheet 1

INVENTOR.
CHARLES E. BRANICK
BY
Merchant, Merchant & Gould
ATTORNEYS

Dec. 24, 1963  C. E. BRANICK  3,114,937
COLLAPSIBLE CURING RIM
Filed Sept. 25, 1962  2 Sheets—Sheet 2

INVENTOR.
CHARLES E. BRANICK
BY
Merchant, Merchant & Gould
ATTORNEYS

United States Patent Office 3,114,937
Patented Dec. 24, 1963

3,114,937
COLLAPSIBLE CURING RIM
Charles E. Branick, % Branick Manufacturing Co.,
Box 1937, Fargo, N. Dak.
Filed Sept. 25, 1962, Ser. No. 226,136
3 Claims. (Cl. 18—45)

This invention relates to an endless, segmental, collapsible curing rim for pneumatic vehicle tire retreading apparatus.

More particularly, this invention relates to a collapsible curing rim insertable into a tire casing behind an inflatable air bag so that when such air bag is inflated, the collapsible curing rim causes the air bag to press the tread and shoulder portions of the tire outwardly against the matrix, or heater, of a retreading mold.

As those familiar with the air of pneumatic vehicle tire retreading appreciate, it is customary to apply pressure to the inside of the tire casing so as to force the tread and shoulder portions, or at least the crown thereof, firmly against a heated curing mold. The apparatus of this invention is intended for use with a conventional air bag, such as a conventional so-called oval bag, which is inserted within a tire casing to be retreaded. Then, as a backing member for internally embracing and supporting the air bag means when the same is inflated, there is conventionally employed a nonyielding support or ring, herein called a curing rim, which is usually an annular, nonyielding support receivable within the tire for engagement with the inside of the casing behind the air bag. Then, when the air bag means is inflated with the curing rim in position, the pressure exerted against the inside of the casing is confined to those casing areas that are externally embraced or supported by the curing mold in a manner desirable, and even necessary, to provide a good quality bond between new rubber and old rubber of the casing and to provide proper flowing of the new rubber so as to completely fill the curing mold during vulcanization. While curing rims have been proposed heretofore (see, for example, U.S. Patent No. 2,679,662), none is known which possesses the superior features of the curing rim of this invention.

The present invention is concerned with and has as one of its principle objects the provision of an improved endless, segmental, collapsible curing rim for tire retreading apparatus.

It is another object of this invention to provide a curing rim composed of a plurality of cooperating segments in which axial movement of each segment relative to the other is limited and in which adjacent segments can be displaced in directions radially and circumferentially of said rim.

Another object of this invention is to provide a curing rim composed of a plurality of cooperating segments whose radial faces interlock with one another by means of circumferentially extending mating tongue and groove elements.

Another object of this invention is to provide a plurality of cooperating segments yieldingly held together in side by side relationship to provide an endless, segmental, collapsible curing rim.

A further object of this invention is to provide a segment for a collapsible curing rim which will interlock with other like segments to form an endless, segmental, collapsible curing rim by means of the bias exerted on such segments by internally connected elastic means.

A still further object of this invention is to provide a segment which can cooperate with other mating segments to provide an annulus, each such segment being fitted on radial faces with tongue elements and groove elements.

Other and further objects will become apparent to those familiar with this art upon a reading of the present invention taken together with the drawings in which.

Figure 1:
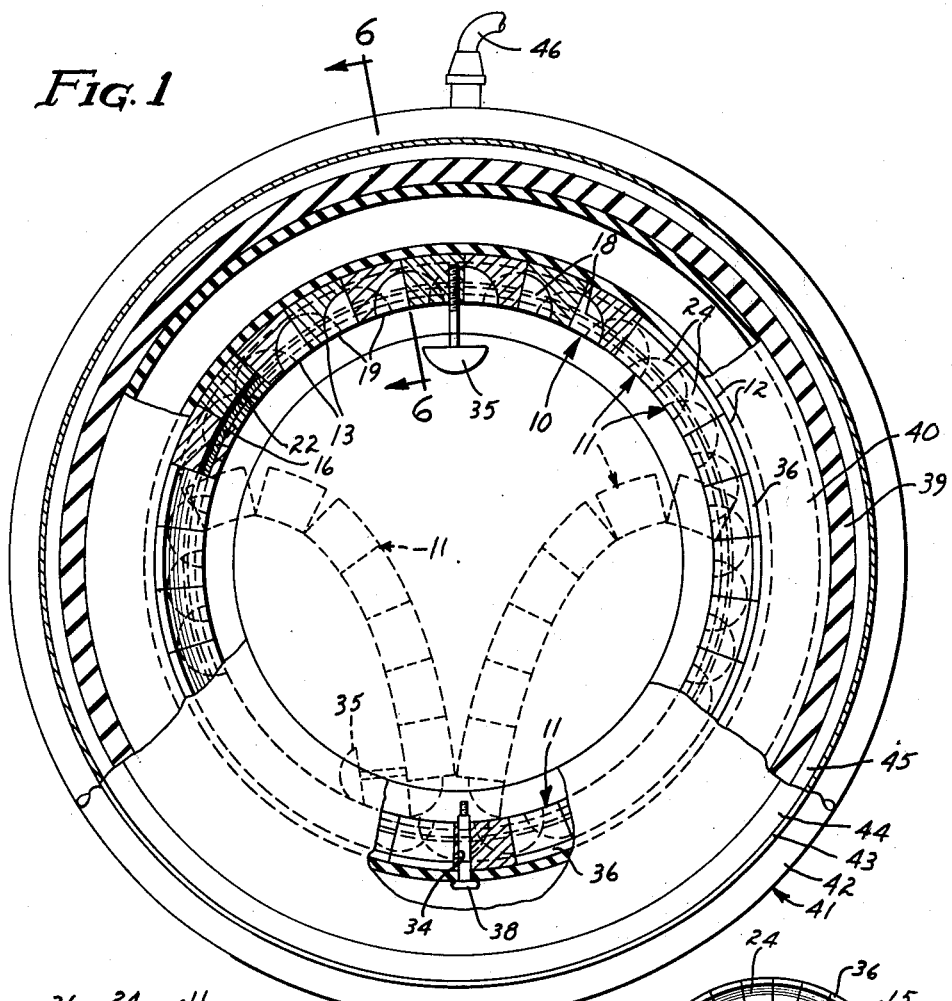
FIG. 1 is a side elevational view of a pneumatic vehicle tire retreading apparatus using an embodiment of the endless, segmental, collapsible curing rim, some parts thereof being broken away and some parts being shown in section.
Figure 2:
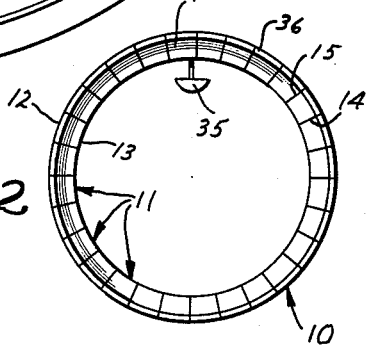
FIG. 2 is a side elevational view of the endless, segmental, collapsible curing rim used in the retreading apparatus of FIG. 1.
Figure 3:
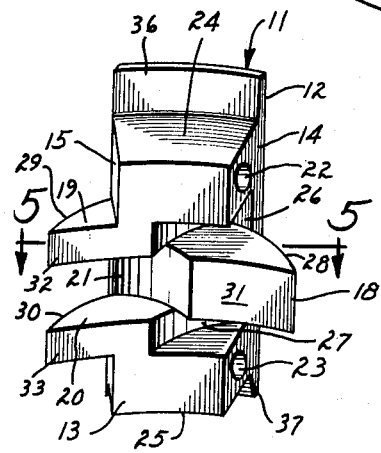
FIG. 3 is an enlarged perspective view of a single segment used in the curing rim of FIG. 2.
Figure 4:
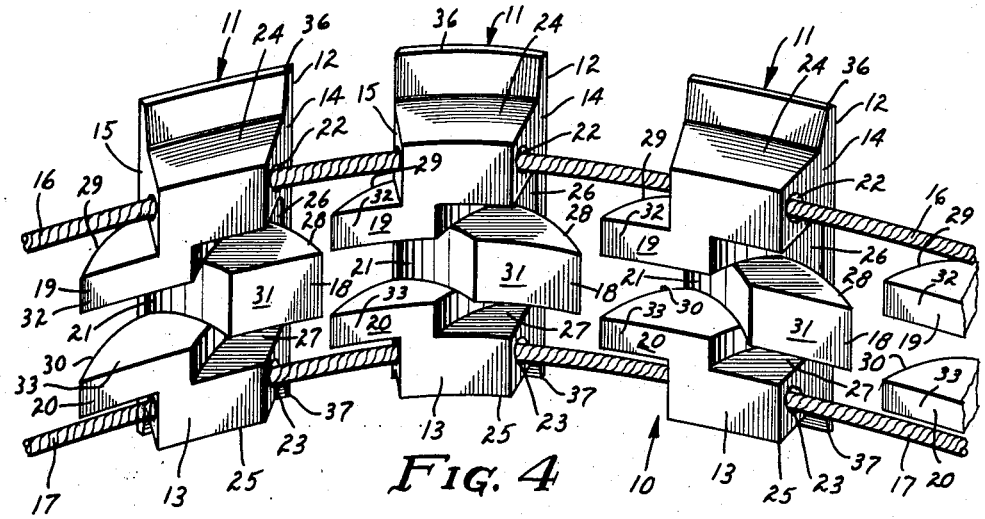
FIG. 4 is an exploded perspective view of a portion of the curing rim shown in FIG. 2.
Figure 5:
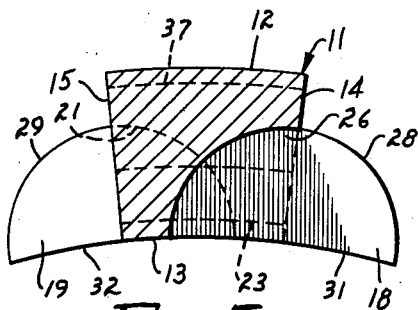
FIG. 5 is a vertical cross-sectional view taken along the line 5—5 of FIG. 3, some parts thereof being shown in section.

Referring now to the drawings, there is seen in FIG. 1 an endless, segmental, collapsible curing rim herein designated in its entirety by the numeral 10. This rim is formed by a plurality of cooperating segments, each of which is herein individually designated in its entirety by the numeral 11.

Each segment 11 has an outer face 12, an inner face 13, and two circumferentially spaced, axially extending radial faces 14 and 15. The outer face 12 and the inner face 13 have respective radii of curvature such that a plurality of cooperating segments taken together cooperate to form an annulus. In the embodiment shown, 28 segments 11 form curing rim 10.

Each of the segments 11 has two apertures 22 and 23 extending circumferentially therethrough. One aperture 22 is conveniently placed near end edge 24 of segment 11 and the other such aperture is conveniently placed near the respective end edge 25 of segment 11. Individual apertures 22 and 23 in a plurality of segments 11 align end-to-end so as to produce a pair of continuous channels passing circumferentially through the annulus comprising the curing rim 10.

Passing through aligned apertures 22 and 23 in a plurality of interconnecting segments 11 are coil springs 16 and 17, respectively, each of which is in tension so as to yieldingly hold the segments 11 in face-to-face engagement of the respective adjacent radial faces thereof. While a pair of coil springs is here employed, it will be appreciated that any endless elastic ring could be used for this tensioning function to yieldingly hold the segments in radial face to radial face engagement. Instead of an endless ring one could employ individual elastic means joining the radial face of one segment to an adjacent radial face of another segment. Similarly, between radial faces and convenient number of separate elastic means, means can be employed to position and secure the radial faces in the desired yielding face-to-face engagement with one another. Thus, while two such spring means are employed in the embodiment shown, it will be appreciated by those skilled in the art that one or more than two such spring means could be employed to hold one segment to another.

Figure 6:
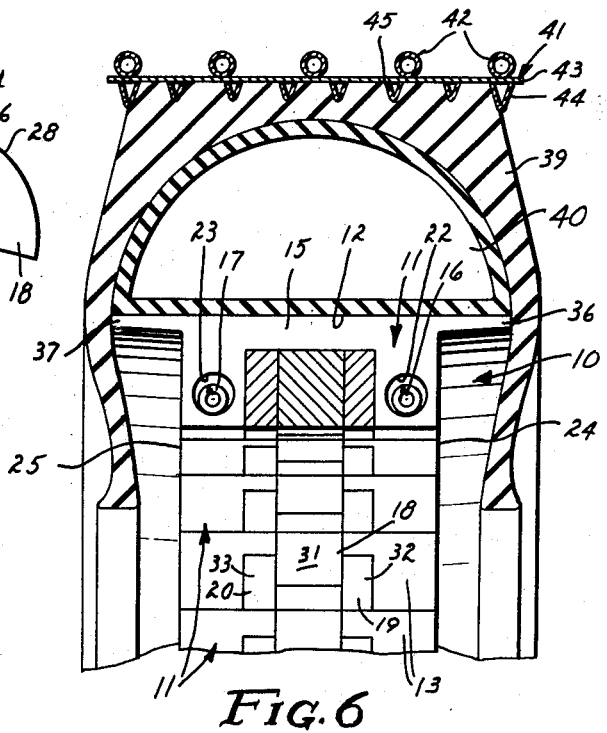
FIG. 6 is a radial section of the tire retreading apparatus of FIG. 1 taken along the line 6—6 of FIG. 1.

The endless, segmental, collapsible curing rim 10 is shown positioned in a tire 39 behind an air bag 40, the air bag 40 being positioned inside the tire adjacent the road-engaging surface portion and associated side wall portions of such tire 39. Around the outside of the tire 39 about the road-engaging surface portions thereof is positioned a curing rim 41 which is composed of steam lines 42, plate 43 and tire confining flanges 44 and tire rib forming flanges 45. Steam lines 42 are fed by steam supply line 46. (See FIGS. 1 and 6.)

Each segment 11 has a tongue element 18 projecting generally circumferentially from one of its radial faces 14. In the opposite radial face 15 is positioned a groove 21 for reception of the tongue element 18 of an adjacent segment. In the embodiment shown, groove 21 is actually partly formed by groove walls 19 and 20 and partly by the body of segment 11. Groove walls 19 and 20 are in spaced parallel relationship to one another and project circumferentially from radial face 15. In order to permit each groove wall 19 and 20 to nest in the radial face of an adjoining segment there is provided on either side of tongue element 18 a cavity 26 and 27. Thus, when a tongue 18 of a segment 11 is slipped into a groove 21, groove walls 19 and 20 slip into respective cavities 26 and 27 thereby producing the desired interlocking action. Indeed, the groove walls 19 and 20 could be considered as tongue elements and the cavities 26 and 27 as groove elements so that, as a consequence, it could be said that in the embodiment shown each radial face 14 and 15 has both tongue elements and groove elements adapted for reception of mating elements of adjacent segments.

It will also be seen from examination of the embodiment shown that the tongue element 18 and the respective groove walls 19 and 20 each project from respective radial faces 14 and 15 such a circumferential distance that each projects more than half the circumferential distance across the radial inner face 13 of a segment 11 when a plurality of segments are engaged with one another.

The effect of the groove walls 19 and 20, the tongue element 18, the groove 21, and cavities 26 and 27 is generally to cause the segments to be limited in their axial movement relative to each other when cooperating to form a curing rim 11. Hence, in a curing rim 11, the tongue and groove arrangement is such that bending of the annulus comprising curing rim 10 is prevented. Thus, substantially no distortion of the planar configuration of adjoining respective edges 24 and 25 occurs.

Another feature of the embodiment shown is that the outer edge 28 of tongue element 18, the outer edge 29 of groove wall 19 and the outer edge 30 of groove wall 20, are each curved uniformly and continuously beginning where each such respective outer edge leaves its respective radial face 14 and 15 and extending outwardly and downwardly to respective inner edges 31, 32 and 33 of tongue element 18, groove wall 19 and groove wall 20.

Inner edge 31 of tongue element 18, inner edge 32 of groove wall 19, and inner edge 33 of groove wall 20 each have respective radii of curvature such that when the plurality of cooperating segments cooperate to form an annulus, the inner edges 31, 32 and 33 of elements 18, 19 and 20, respectively, lie flush with the respective inner faces 13 of adjacent segments. The overall effect is that the curved outer edges 28, 29 and 30 of, respectively, tongue element 18, groove wall 19, and groove wall 20 permit angular displacement of each segment relative to the other thereof in directions radially and circumferentially of the curing rim 10 against the bias of coil springs 16 and 17 without effecting the ability of the individual segments to cooperate with one another and to produce an annulus which resists radial displacement or distortion.

It is another feature of the embodiment shown that outer edge 28 of tongue element 18, outer edge 29 of groove wall 19, and outer edge 30 of groove wall 20 are each radially spaced from outer face 12 at the point where each such respective outer edge begins to project circumferentially from radial faces 14 and 15. Such an arrangement aids in stabilizing and strengthening the curing rim 10 when shaped in the form of an annulus thereby aiding the ability of the formed annulus to resist radial displacement.

A still further feature of the embodiment shown in the above drawings is that, owing especially to the elongated tongue element 18, and groove walls 20 and 19, and their respective corresponding receiving grooves 21 and cavities 26 and 27 in adjoining segments, it is only with extreme stretching of the elastic means that an individual segment is dislocatable from interlocking engagement with adjoining segments. When it is desired to break curing rim 10 after it has been used inside a tire casing during a retreading operation, one needs to exert no special care to prevent dislocating adjacent segments from face-to-face engagement of the radial faces thereof. Thus, the curing rim 10 can be easily handled, manipulated and distorted from a circular configuration without scrambling individual segments, such as would tend to occur when one were to employ segments having, for example, tongues and grooves projecting only very short distances from respective radial faces of individual segments.

In one of the segments 11 forming a curing rim 10 a valve stem hole 34 is conveniently formed for a valve stem 38 as by cutting or coring through such segment 11. This valve stem hole is provided for the air bag (not shown) which lies peripherally of the curing rim in a tire casing during a retreading operation.

Conveniently, a T-handle 35 is provided upon one or more inner faces 13 of individual segments 11 so as to form a small handle or loop for manually breaking the curing rim 10 from an annular configuration when it is desired to remove the curing rim 10 from a tire casing (not shown) following a retreading operation.

In order to permit one to use one basic segment arrangement with tire casings of different widths, it is convenient to employ flange elements 36 and 37 positioned on respective edges 24 and 25 of each individual segment 11. Such flange elements 36 and 37 can be either individually formed and separately secured to each segment (as by screw fittings) or such flange elements 36 and 37 can be formed integrally with a segment 11 as in the embodiment shown in the figures. Such flange elements are provided as needed on each segment to adapt a curing rim for use with tires of different widths, as mentioned.

The T-handle can be formed either integrally with a segment as made or it can be separately formed and then fitted into a drilled or tapped hole in one segment, perhaps in that section opposite valve stem hole 34 in a curing rim 10.

In summary, the present invention relates to an endless, segmental, collapsible curing rim comprising a plurality of cooperating segments, each segment having radially spaced inner and outer faces and circumferentially spaced axially extending radial faces, said inner and outer faces having respective radii of curvature such that the plurality of cooperating segments cooperate to form an annulus, elastic means yieldingly urging said segments toward abutting engagement of the radial faces of each thereof with adjacent radial faces of adjacent segments, each segment having a tongue element projecting generally circumferentially from one of said radial faces and a groove in the opposite radial face for reception of the tongue element of an adjacent segment, the tongue and groove arrangement limiting axial movement of each segment relative to the other thereof and permitting angular displacement between adjacent segments in directions radially and circumferentially of said rim against bias of said elastic means.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

The claims are:

1. An endless segmental collapsible curing rim comprising a plurality of cooperating segments, each segment having:
   (a) radially spaced inner and outer faces and circumferentially spaced axially extending radial faces,
   (b) said inner and outer faces having respective radii of curvature such that the plurality of cooperating segments cooperate to form an annulus,
   (c) elastic means yieldingly urging said segments toward abutting engagement of the radial faces of each thereof with adjacent radial faces of adjacent segments, (d) each segment having a tongue element projecting generally circumferentially from one of said radial faces and a groove in the opposite radial face for reception of the tongue element of an adjacent segment, and (e) the tongue and groove arrangement limiting axial movement of each segment relative to the other thereof and permitting angular displacement between adjacent segments in directions radially and circumferentially of said rim against bias of said elastic means.

2. An endless collapsible curing rim comprising a plurality of cooperating segments, each segment having:

(a) a radially outer face of generally rectangular shape, (b) a radially inner face spaced radially inwardly of said outer face, (c) said inner face and said outer face each having respective radii of curvature such that the plurality of cooperating segments together form an annulus, (d) circumferentially spaced, axially extending radial faces, (e) a tongue element projecting circumferentially from one of said radial faces, (f) a groove in the other of said radial faces for reception of the tongue element of an adjacent segment, and (g) elastic means yieldingly urging each of said segments toward face to face engagement of the radial faces thereof.

3. An endless collapsible curing rim comprising a plurality of cooperating segments, each segment having:

(a) a radially outer face of generally rectangular shape, (b) a radially inner face spaced radially inwardly of said outer face, (c) said inner face and said outer face each having respective radii of curvature such that the plurality of cooperating segments together form an annulus, (d) circumferentially spaced, axially extending radial faces, (e) a tongue element projecting circumferentially from one of said radial faces, (f) a groove in the other of said radial faces for reception of the tongue element of an adjacent segment, (g) each of said segments having at least one aligned aperture extending circumferentially therethrough, and (h) an endless elastic ring extending through said aligned apertures and being in tension to yieldingly hold said segments in face to face engagement of the radial faces thereof.

References Cited in the file of this patent

UNITED STATES PATENTS

| | | |
|---|---|---|
| 1,150,487 | Berry | Aug. 17, 1915 |
| 2,700,795 | Kraft | Feb. 1, 1955 |
| 2,817,877 | Fannen | Dec. 31, 1957 |
| 2,850,768 | Elrick et al. | Sept. 9, 1958 |